E. D. C. BAYNE & L. A. SUBERS.
AUTOMATIC MACHINE FOR THE MANUFACTURE OF UNWOVEN TUBULAR FABRIC UPON A LONGITUDINALLY MOVING MANDREL OR FORMER.
APPLICATION FILED APR. 23, 1909.
991,266.
Patented May 2, 1911.
3 SHEETS—SHEET 1.
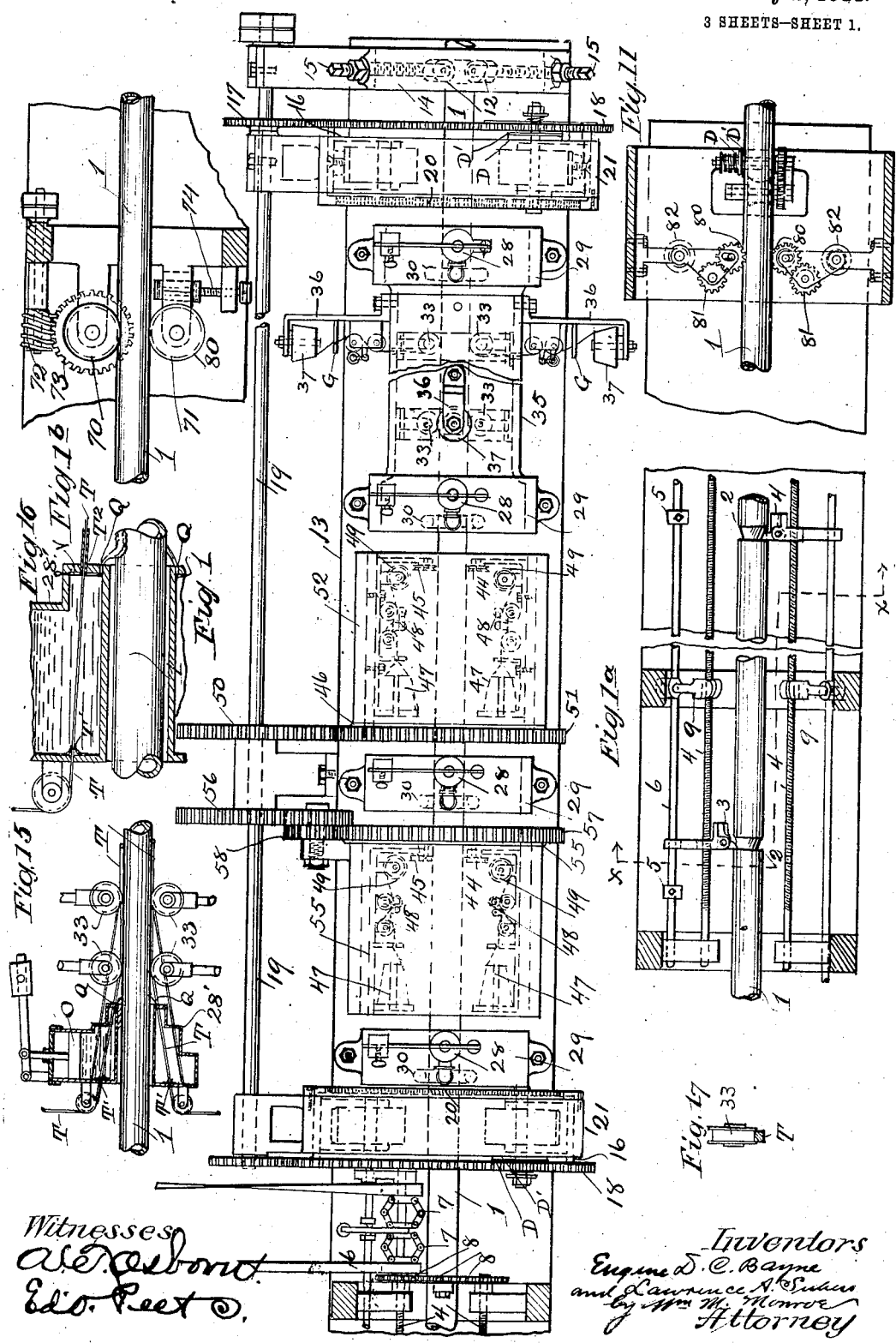

E. D. C. BAYNE & L. A. SUBERS.
AUTOMATIC MACHINE FOR THE MANUFACTURE OF UNWOVEN TUBULAR FABRIC UPON A
LONGITUDINALLY MOVING MANDREL OR FORMER.
APPLICATION FILED APR. 23, 1909.
991,266.
Patented May 2, 1911.
3 SHEETS—SHEET 2.
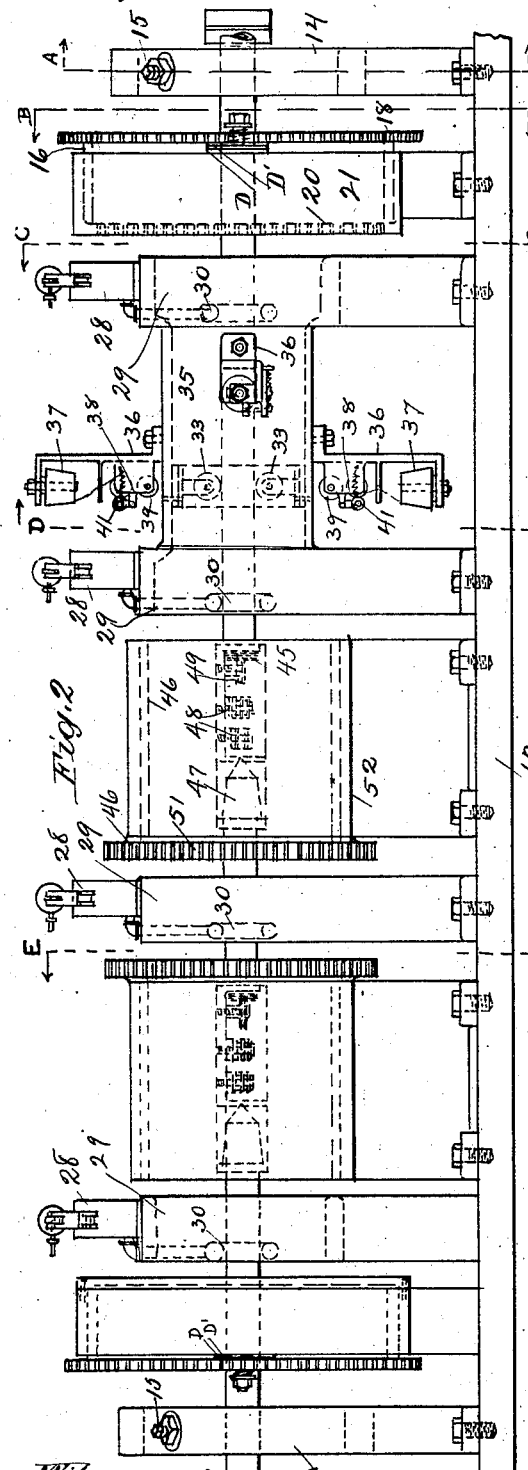
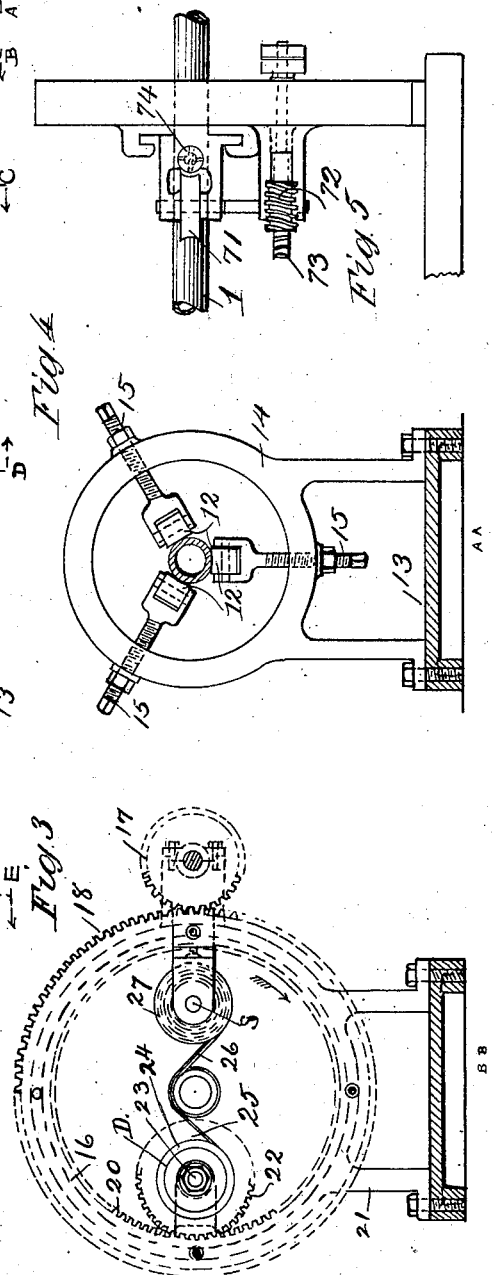

E. D. C. BAYNE & L. A. SUBERS.
AUTOMATIC MACHINE FOR THE MANUFACTURE OF UNWOVEN TUBULAR FABRIC UPON A
LONGITUDINALLY MOVING MANDREL OR FORMER.
APPLICATION FILED APR. 23, 1909.
991,266.
Patented May 2, 1911.
3 SHEETS—SHEET 3.
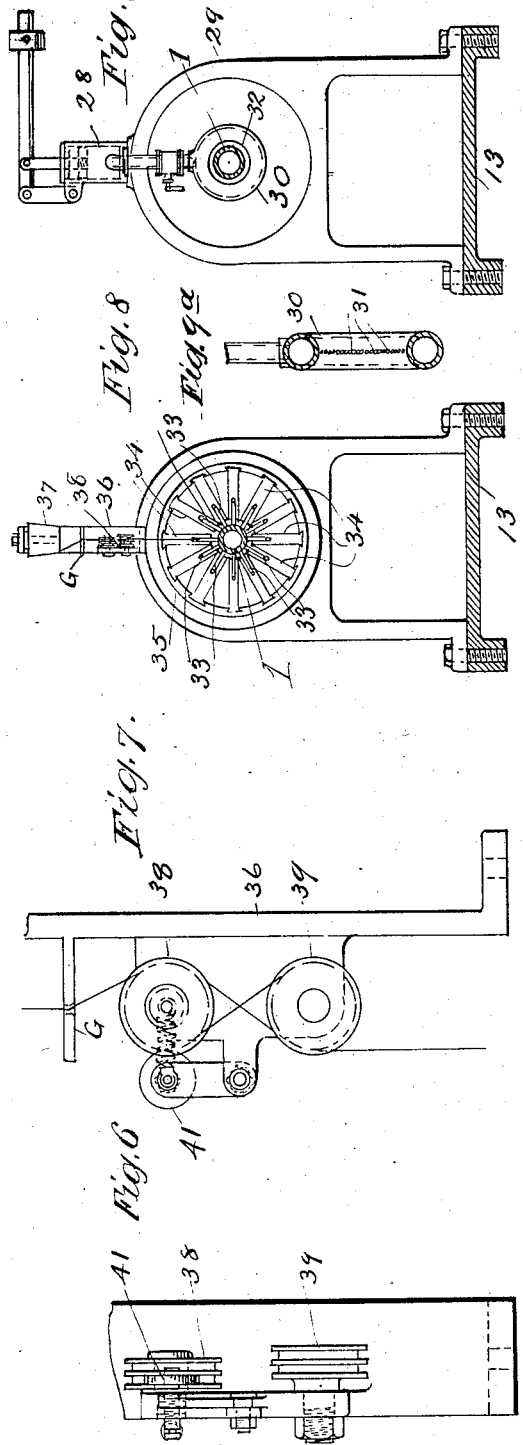
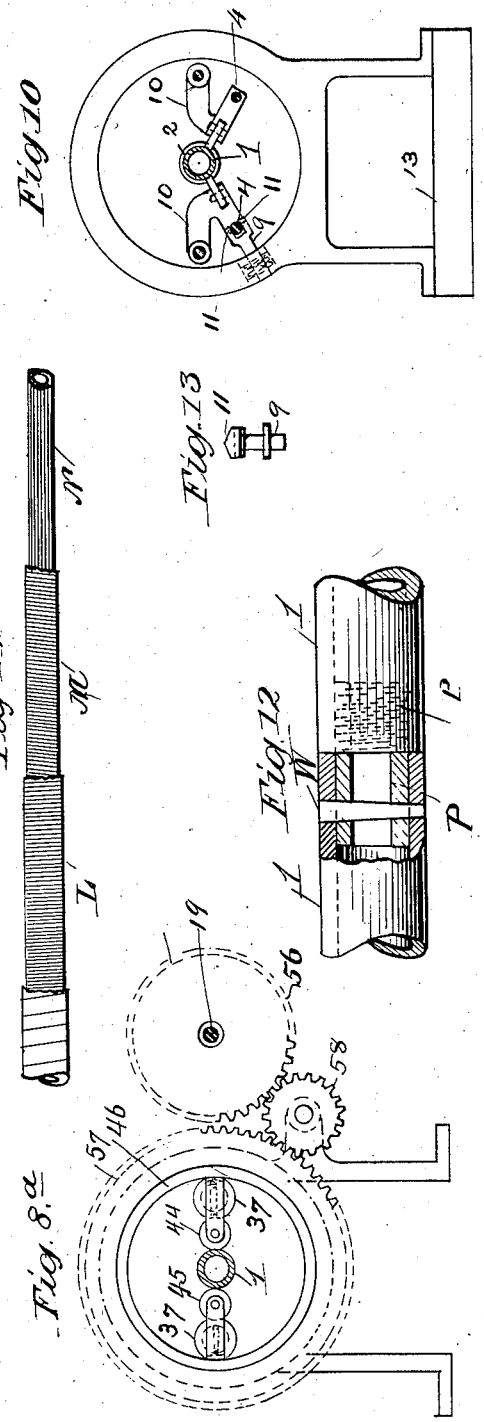

UNITED STATES PATENT OFFICE.

EUGENE D. C. BAYNE AND LAWRENCE A. SUBERS, OF CLEVELAND, OHIO.

AUTOMATIC MACHINE FOR THE MANUFACTURE OF UNWOVEN TUBULAR FABRIC UPON A LONGITUDINALLY-MOVING MANDREL OR FORMER.

991,266. Specification of Letters Patent. Patented May 2, 1911.

Application filed April 23, 1909. Serial No. 491,738.

*To all whom it may concern:*

Be it known that we, EUGENE D. C. BAYNE and LAWRENCE A. SUBERS, citizens of the United States, and residents of Cleveland, in the county of Cuyahoga and State of Ohio, have invented certain new and useful improvements in automatic machines for the manufacture of unwoven tubular fabric upon a longitudinally-moving mandrel or former, of which we hereby declare the following to be a full, clear, and exact description, such as will enable others skilled in the art to which it appertains to make and use the same.

The objects of the invention are to provide means for manufacturing an unwoven tubular fabric such as has been previously described in our Letters Patent No. 885,219, bearing date of April 21st, 1908. This fabric is composed of coated adhering cords or threads closely applied in parallel rows, which are arranged in adhering layers in which the rows in one layer are longitudinally applied in the fabric, alternating with layers in which the rows are circumferentially or spirally applied.

In our previous applications for fabric making machines Serial Nos. 467,621 and 479,488 the threads have been applied respectively to a rotating mandrel by means of longitudinally moving thread applying devices, and to a stationary mandrel by means of thread applying devices which have both a longitudinal movement relatively to the mandrel and are simultaneously rotated about the same.

The object of this invention as distinguished from those disclosed in the other applications is to impart a longitudinal movement to the fabric itself in connection with thread laying devices which have no longitudinal movement.

Further objects are to provide a longitudinally moving mandrel preferably hollow upon which the fabric is applied, and a device for giving a continuous regular movement thereto, the mandrel being of such a character that indefinite lengths of tubing such as hose can be manufactured thereon.

Further objects are to provide a mandrel of such a character that it can be passed through a vulcanizing device, and the fabric vulcanized thereon by the usual method after completion.

Further objects are to provide instrumentalities for applying an initial coating or lining of calendered rubber to the mandrel, which should have a smooth surface for this purpose, and also to provide instrumentalities for applying a longitudinal layer of parallel rows of cord or thread to the mandrel, in such a manner as to completely cover the circumference of the mandrel or former with the layer, and with the several rows in close engagement so as to leave no interstices between them.

Further objects are to provide instrumentalities for applying the circumferential or spiral rows of threads, in close contact to form alternating layers with the longitudinally disposed rows of threads.

Other features of the invention have reference to instrumentalities providing a flow of unvulcanized liquid or viscous rubber under pressure to each thread and layer in advance of the action of the device for applying the subsequent layer of thread, so that each thread shall be completely inclosed in rubber and all threads and layers shall be separated from frictional contact with each other, and whereby an abundance of rubber will be supplied and incorporated between the layers, so that when vulcanized the fabric will be flexible and no minute opening will be left for possible blowing through, when internal pressure is applied to the tubing.

Other features relate to instrumentalities for applying the calendered rubber in strips either spirally or longitudinally on the mandrel or former and between the alternate layers of threads, and means for storing the calendered and unvulcanized rubber in rolls with intermediate strips of non-adhesive material and for separating the rubber and non-adhesive strips at the time of applying the rubber to the mandrel or alternate layers of threads and also to provide operating means therefor.

The invention further includes the arrangement of grouping of the thread applying director wheels in such a manner as to completely cover the outer circumferential surface of the hollow mandrel with the threads of the longitudinal layer, and also includes supports for the director wheels which are revolved about the mandrel to apply the spiral or circumferential layer of threads, and also mechanism adapted to lay alternating spiral layers at different angles so that they will not only cross the longitudinal layers at an angle but also will cross each other at an angle.

The invention also comprises the operating means for the several instrumentalities whereby their movements are rendered automatic.

It also comprises supporting means and propelling means for the mandrel or former and operating means therefor.

In this machine the character of the mandrel can be such as to be readily handled in the manufacture of hose of any required length and can be made suitable for introduction into a vulcanizer and in sectional parts attachable together as fast as introduced into the machine, or the mandrel can be made of flexible fabric, metallic or otherwise, which can be coiled in a continuous manner in a suitable vulcanizing device of any kind, after the fabric has been completed thereon. It is also possible with this type of machine to alternate the layers of longitudinal and spiral rows of threads in any desirable manner; to lay the calendered rubber strips longitudinally or spirally in any desired position in the fabric, and to lay intermediate or external layers or coatings of any desired character upon the mandrel. In illustration of which it may be said that a layer of ordinary woven fabric can be laid intermediate between any two layers of rows of threads to absorb sudden or torsional strains upon the tubing and exterior protecting wrappings of any kind can also be advantageously applied therewith.

The invention further consists in the combination and arrangement of the various parts and construction of details as exemplified in the accompanying drawings, hereinafter more particularly described and specifically pointed out in the claims.

In the accompanying drawings, Figure 1 is a plan view of a device showing at the left of the figure a clutch device for operating the mandrel propelling mechanism which pulls it through the machine and is also adapted to the introduction of the mandrel continuously in sectional parts; Fig. 1ª is a plan view of this propelling mechanism and is in continuation of Fig. 1; Fig. 1ᵇ is a plan view of a modified form of propelling mechanism adapted to introduce the mandrel from the rear and also adapted to the introduction of the mandrel continuously in sectional parts; Fig. 2 is a side elevation of the machine; Fig. 3 is a transverse section of the device on line A, A Fig. 2, showing mandrel guides and supports; Fig. 4 is a transverse section on line B, B Fig. 2, showing devices for applying the calendered rubber strips to the mandrel; Fig. 5 is a vertical elevation of the device shown in Fig. 1ᵇ for propelling the mandrel; Fig. 6 is an edge view of the device for applying such tension as may be required in laying the cord or thread upon the mandrel; Fig. 7 is a side elevation of the tension device; Fig. 8 is a transverse section on line D, D Fig. 2, showing the radially arranged director wheels which are employed to apply the longitudinal rows of threads upon the mandrel; Fig. 8ª is a transverse section on line E, E Fig. 2, showing director wheels and support therefor mounted for rotation about the mandrel to apply the spiral rows of thread; Fig. 9 is a transverse section on line C, C Fig. 2, showing the device for applying rubber under pressure to the mandrel or to any one of the coatings thereon; Fig. 9ª is a central section of the rubber applying ring; Fig. 10 is a transverse section through line $x$, $x$ Fig. 1ª showing depressible supports for the feed screws and the carriers and guides for the propelling dogs; Fig. 11 is an enlarged view of the device for laying the calendered rubber strips longitudinally upon the mandrel; Fig. 12 is an elevation of abutting portions of the mandrel showing attaching means therefor; Fig. 13 is an enlarged side elevation of the feed screw support showing cam surfaces by means of which the support is depressed by the carrier when passing; Fig. 14 is a side elevation of a flexible unwoven tube such as is produced by this machine; Fig. 15 is a longitudinal section of a preferred form of rubber applying device; Fig. 16 shows an enlarged portion of the same; and Fig. 17 is an elevation of a modified form of a director wheel adapted to apply the thread formed to a rectangular section.

These views illustrate an operative form of the machine and may be described as follows:

1 is the mandrel or former which is designed to pass centrally through the machine as the fabric is manufactured thereon.

Means are employed for giving a continuous forward movement to the mandrel. A preferable manner of propelling the mandrel from the rear is shown in Figs. 1ᵇ and 5 where 70, 71 are rollers engaging the mandrel on opposite sides, 72 and 73 are a worm and gear device which powerfully rotates the roller 70. The roller 71 can be adjusted by means of a screw 74 to obtain any pressure desired upon the mandrel. In Figs. 1 and 1ª this pressure is shown to be obtained by a pulling movement, and can be employed with a mandrel of greater length than the length of the hose or tubing to be made as for instance a 10 to 50 ft. section.

In the device shown in Fig. 1ª annular ratchet grooves 2, 2 are cut in the mandrel, which are engaged by pivoted dogs 3 and 4 respectively, and the notches occur at intervals greater than the length of the hose to be made. Screws 4, 4 propel these ratchet dogs so that when one dog engages an adjustable set collar 5 on the shifter rod 6 the reversing mechanism shown at 7, 7 will reverse the screws through the medium of connecting gears 8, 8 and when traveling backward the pivoted dogs will slide on the mandrel without engagement therewith, until another set of grooves are encountered. This action is illustrated in Figs. 1a and 10 and since the screw rods are necessarily very long they are supported by means of depressible forks 9, 9 which are moved back by means of the carriers 10, 10 upon which the pivoted dogs are mounted and the cam edges 11, 11 of the depressible supports 9, 9. Rollers 12, 12 such as are shown in Fig. 4 can be employed in any desired position in the machine to support the mandrel.

In Figs. 1 and 2, 13 is a bed plate, 14, 14 terminal bearings in which the rollers 12, 12 are mounted upon adjustable stems 15, 15.

The first operation shown in constructing the tubular fabric is that of applying the unvulcanized calendered rubber in strips to the smooth mandrel, and is accomplished by means of a device such as shown in Figs. 1, 2 and 3. Here 16 is a drum rotatable about the mandrel by means of the spur gears 17 and 18 and drive shaft 19. Outside of this drum is shown stationary drum 21 having an internal gear 20 thereon. A pinion 22 engages the internal gear and is mounted upon the shaft 23 in the rotatable drum 16. Upon this shaft is also mounted a spool 24 upon which a continuous strip of oiled paper or other non-adhesive material 25 is wound. The oiled paper together with a continuous strip of calendered rubber 26 is first rolled upon the opposite roll 27 mounted upon a second shaft s in the drum 16, in such a manner that the rubber and paper alternate. The rubber strip is wound upon the mandrel and the paper strip is passed over to the spool 24. The result of which action is that the rubber strip is spirally wound about the mandrel as the mandrel is fed through the machine, and the paper is rolled upon the paper spool 24, while both rolls revolve about the mandrel. The rate of motion as taken from shaft 23 is adjusted by means of friction disks D, D'. The edges of the rubber strip or band are preferably beveled so as to overlap and form smooth joints.

Before applying the first layer of threads N it is essential that the layer of unvulcanized calendered rubber should be coated with a predetermined amount of fluid rubber with which the threads will be thoroughly coated and which will fill all interstices between them. This fluid rubber may be quite fluid or may be heavy and viscous. It is preferable however that the volatile solvent should be evaporated therefrom as far as possible to prevent the formation of gas when the vulcanization takes place and the consequent formation of pockets or openings in the rubber. Any suitable means for evaporating the gases and solidifying the rubber may be utilized for this purpose such as a blower, or by heated rolls or otherwise.

For the purpose of applying the fluid rubber a gravity device or a device shown in Figs. 1, 2, 9 and 9a can be used. Here a force pump 28 is shown mounted upon a suitable standard 29, and a pipe leads therefrom to a hollow ring 30. The rubber is forced through openings 31, radially disposed in the inner edge of this ring, as shown in Fig. 9a, or one continuous annular opening 32 can be employed as shown in Fig. 9. As soon as the soft coating of liquid rubber is applied the longitudinally disposed layer of closely engaging rows of threads N is laid thereon, as shown in Figs. 1, 2, 8 and 14. Here 33, 33 are grooved director wheels over which a multiple number of prepared threads are passed directly to the mandrel and coating thereon. These director wheels are radially arranged and are formed preferably in groups or circles, one group a little in advance of the other so as to finally cover the entire surface of the mandrel or former. Suitable supports 34, 34 for the director wheels are secured in a stationary ring 35, and to this support are secured as many brackets 36, 36 (only one of which is shown in Fig. 8 and only three in Figs. 1 and 2) upon which are secured the spools 37 and tension devices 38. The tension devices are shown in Figs. 6 and 7 to comprise grooved rollers 38 and 39, one of which is rotatable. Over these rollers the thread passes through a guide G and additional friction is obtained by means of the spring pressed roller 41, which enters one of the grooves in the roller 38. After the first longitudinal layer is applied a second coating of fluid rubber is applied by a similar rubber laying device 30 and pump 28, or by the device shown in Figs. 15 and 16, or other suitable device. Next a spiral or circumferential layer M is applied by means of similar director wheels 44 and 45 secured within the rotatable drum 46. See Figs. 1 and 2. In this device the spools 47, tension wheels 48, guide wheels 49 and director wheels 44 and 45 are mounted upon the inside of the rotating drum 46 and are all caused to rotate about the mandrel through the agency of the spur gears 50 and 51 and drive shaft 19 previously described. The drum 46 is mounted in a standard 52. A third coating of rubber is then applied by means of a similar coating ring 30 and pump 28 after which a second spiral layer L can be applied thereon at an angle to and in the reverse direction to the first laid circumferential or spiral layer. This is accomplished by means of a rotatable drum 55 and spur gears 56 and 57 and idler 58 to reverse the movement. The director wheels 44 and 45 and tension devices 48 and 49 and spools 47 are similar in all respects to the devices just described for laying the first spiral layer. The director wheels for spiral laying are preferably oppositely placed so as to lay two threads at once, but any desired number of director wheels can be employed for laying the spiral layers. Following the laying of the last layer of threads another coat of liquid rubber should preferably be applied and the same sort of rubber applicator 30 and pump 28 can be used for this purpose. An outer coating of spirally or longitudinally laid calendered rubber or layer of any material can then be applied or an outer coating of any character of fabric. The same devices as previously shown in Fig. 3 can be employed for this purpose if desired. It is obvious that the same devices can be used for wrapping the tube preparatory to vulcanizing the same.

In Fig. 11, a device for applying the calendered rubber longitudinally upon the fabric formed upon the mandrel is shown. Here 80, 80 are geared rollers engaging the mandrel over which the rubber band passes. 81, 81 are the winding rollers for paper and 82, 82 are the rollers over which the rubber and paper are wound for storage.

In Fig. 12 the sections of the hollow mandrel 1 are attached together by means of a hollow plug P driven tightly or screwed into one section, and a wedge W driven through openings in both shaft and plug in the other section in which the plug is a close sliding fit.

In Fig. 14 is represented a section of our tubing used as a hollow flexible mandrel, portions of the several layers being removed to show the arrangement of alternating layers of spiral and longitudinal rows of threads lettered L, M, and N respectively.

The former or mandrel on which the fabric is produced if rigid can be made in sections connected together when introduced into the machine as shown in Fig. 12 and if flexible may be maintained in an expanded condition by means of pneumatic or hydraulic pressure or may be filled out with some solid but flexible substance which will give the mandrel sufficient hardness and rigidity, so that it can keep its shape while the fabric is being constructed thereon and can be operated in the machine without difficulty. A peculiarity of our unwoven fabric previously patented and described is that it will not only become as rigid as a bar of iron when subjected to internal pressure but will remain perfectly straight under extreme internal pressure without twisting owing to the perfect equalization of tensions therein, and hence is peculiarly adapted for use as a flexible mandrel or former upon which to manufacture tubular fabric. As soon as the tubular fabric is completed and ready to vulcanize, a portion of, or all of the internal pressure can be released, and steam or heated air under pressure can be admitted in its place, until an equal degree of expansion has been obtained, and the internal heat combined with the application of external heat in the vulcanizer will produce perfect vulcanization. As soon as vulcanized the pressure can be released, and the vulcanized fabric can be stripped from the mandrel by the introduction of air under pressure between the flexible mandrel and fabric or by any convenient method. Any desired forms of steam connections can be made.

A flexible but stiffer and more rigid fabric can be formed of the reinforced thread described in our Letters Patent No. 918,414 granted April 13th, 1909. The machine is adapted also to form the fabric from coated thread of any character whether laid as single threads or threads combined edge to edge to form bands and applied in the manner of applying the calendered bands or in any convenient manner. The threads could all pass through the rubber tanks or receptacles for holding rubber under pressure and issue with an external coating of any desired thickness before laying, as shown in Figs. 15 and 16. Also the amount of rubber required for coating could be lessened, and the interstices between the circular threads would be much diminished in size if the threads were flattened prior to laying them in the fabric. It is however essential that the threads when laid should be inclosed in rubber, and it is optional whether the threads are provided with their coatings prior to, or at the time of, laying them in the fabric. It is also much easier to flatten the several threads prior to laying them in the fabric than to crush the fabric and to compress it into compact shape after it has been constructed and before vulcanizing and there is less danger of injury to fabric.

In Figs. 15 and 16 a circular tank 28' filled with rubber under controllable pressure from a piston O or from gravity is provided with openings Q through which the rubber is forced in jets upon the mandrel.

The thread T may pass through the protected opening T' into the tank and pass out of the somewhat larger opening T² immediately to a director wheel 33. The thread in passing through the opening T² will be coated with the rubber and hence will be even better adapted to be entirely embedded in the rubber coat than if it had be fed dry to the director wheel. In this manner two objects would be attained that of coating the thread, and coating the layer below, thus insuring a plentiful amount of coating.

Obviously either method could be employed, and the thread alone coated, or the mandrel coated, or both methods could be employed simultaneously. A valve V can be used to close these openings when not in use.

Having described the invention what we we claim as new and desire to secure by Letters Patent is:—

1. In an unwoven fabric making machine, in combination with a longitudinally movable mandrel, a propelling means therefor, a device for applying a preliminary coating of calendered band rubber to the mandrel, a device for applying a coating of fluid rubber thereon, a subsequently acting device for applying longitudinally laid parallel rows of threads to the moving mandrel, a subsequently acting device for applying a coating of spirally laid parallel rows of threads thereon, a device for applying a coating of fluid rubber thereto, a device for applying a coating of spirally laid parallel rows of threads at an angle to the first laid layer of spirally laid threads, said devices adapted to operate automatically to lay said layers and coatings upon said mandrel as it is propelled through the machine.

2. In an automatically acting machine, the combination with a longitudinally movable mandrel, of a device rotatable about the mandrel for applying a coating of calendered rubber in a continuous band thereon, a device for subsequently applying a coating of fluid rubber thereon, under pressure, director wheels for applying longitudinal rows of coated threads thereon to form a layer completely inclosing the mandrel, said director wheels being arranged in staggered rows, a circular support and guides for said director wheels, a device for coating said longitudinal layer of threads, director wheels rotatable circumferentially about said mandrel and adapted to apply coated threads in parallel spiral rows thereon, a revoluble support for said last named director wheels, thread guides in said revoluble support, a device for applying fluid rubber to said spiral layer, a similar rotatable device and director wheels for applying a second spiral layer of coated threads thereon, said second layer being wound at an angle to said first named layer, and a device for applying an exterior coating, a propelling device for the mandrel and means for rotating said aforesaid revoluble parts in unison at a predetermined rate of speed.

3. In a device for applying a calendered band of rubber to a longitudinally moving mandrel, the combination with the mandrel, of a standard, a support therein revoluble about said mandrel, an internal gear in said standard, a gear shaft and a roller thereon adapted to hold a nonadhesive band, a tension device therefor, and an oppositely placed roller in said support upon which said calendered rubber band can be wound together with an intermediate band of nonadhesive material, the said geared roller adapted to receive said nonadhesive band, and the mandrel adapted to receive the calendered rubber band as said mandrel moves forward, and means for rotating said revoluble support and for giving a longitudinal movement to said mandrel.

4. In a device for laying a rubber band in spiral rows upon a mandrel, a fixed standard, a rotatable support thereon, an internal gear in said standard, spaced rollers on said revoluble support, one adapted to receive a rubber band coiled together with an intermediate nonadhesive band, and the other adapted to receive the nonadhesive band as the rubber band is received upon the mandrel, a gear and gear shaft, upon which the receiving roll for the nonadhesive band is mounted, said gear engaging with said internal gear and means for rotating said revoluble support.

5. In a device for applying a rubber coating under pressure to a mandrel, an annular tank, provided with perforations arranged circularly therein, a pressure device and means for adjusting the pressure in said pressure device, and means for giving a longitudinal movement to said mandrel.

6. In a device for applying rubber coating under pressure to a mandrel, an annular tank, provided with perforations, arranged circularly and adapted to discharge the rubber upon the mandrel, a plunger and cylinder and adjustable weight therefor, and a controlling valve placed between said cylinder and said tank.

7. In a device for applying a rubber coating under pressure to a mandrel, the combination with the mandrel, of an annular tank provided with circularly arranged openings, for the discharge of the rubber upon the mandrel, a pressure device therefor, a series of director wheels adapted to apply threads to said mandrel and located in the rear of said rubber tank, and supports for said parts.

8. In a device for applying a rubber coating under pressure to a mandrel and for laying a coating of longitudinal rows of coated threads upon said mandrel, an annular rubber tank provided with annularly arranged means for discharging the rubber upon said mandrel, a pressure device therefor, director wheels adapted to apply coated threads longitudinally upon said mandrel in the rear of said rubber tank, said rubber tank provided with openings through which said threads may be passed to acquire a coating of rubber prior to passing under said director wheels, and supporting devices for said parts.

9. In a device for applying coated threads to a mandrel, an annular tank for rubber, a pressure device therefor, said tank provided with circularly arranged openings, a series of director wheels, over which said coated threads are adapted to pass, said circularly arranged openings adapted to receive said threads as they pass through said tank, and to provide a coating means therefor, and supports for said tank and director wheels and mandrel.

10. In a device for applying a coated thread to a mandrel, the combination with the mandrel, of a rubber container, a pressure device therefor, said tank provided with an opening for the passage of the thread therethrough, said openings being of larger diameter than said thread, whereby said thread will receive a coating as it passes therethrough, a director wheel adapted to apply said coated thread upon the mandrel, means for supporting said tank and director wheel.

11. In mechanism for applying spiral layers of coated threads in opposite directions and at different angles upon a longitudinally moving mandrel, a support and a propelling means for the mandrel, a standard, a rotatable director wheel support therein, a main shaft, engaging gears on said shaft and rotatable director wheel support, director and guide wheels and spools pivoted in said support, and a second stationary standard and rotatable director wheel support therein, gears upon said main shaft and said second rotatable support, and an intermediate idler adapted to engage with the same, director and guide wheels pivoted in said second rotatable support and spools therefor, and an intermediate device between said rotatable support for applying a coating of rubber intermediate of said layers.

12. In combination with a mandrel, a rotatable director wheel support, revoluble around said mandrel, director wheels therein, a second rotatable support adapted to revolve in the opposite direction about said mandrel, director wheels therein, means for revolving them in opposite directions about said mandrel, and means for giving a longitudinal movement to said mandrel.

13. The combination with a mandrel, of a device for applying a layer of parallel rows of threads longitudinally thereon, a device for applying a spiral layer of parallel rows of threads thereon, said last named device rotatable about said mandrel and a device for applying a coating of fresh rubber to said threads, whereby said threads are embedded in rubber, and whereby an intermediate coating of rubber is supplied between said layers, and means for giving a longitudinal movement to said mandrel during the rotation of the means for applying the spiral layers.

14. The combination with a mandrel, of director wheels adapted and arranged to apply a complete layer of longitudinally arranged rows of threads to a mandrel, director wheels and a support therefor, revoluble about the said mandrel adapted to apply a layer of threads in parallel spiral rows about said mandrel, and director wheels and a support therefor revoluble in the opposite direction about said mandrel adapted to apply a layer of threads in parallel spiral rows upon said first named spiral layer in the opposite direction, and means for rotating said revoluble supports in the opposite direction, and means for applying coatings of rubber intermediate of said layers, and means for giving a longitudinal movement to said mandrel.

15. The combination with a mandrel of means for applying a spiral layer of adhesive threads thereto, means for applying thereon a spiral layer of adhesive threads running in the opposite direction to the first named spiral layer, means for coating the threads in the several layers prior to applying the succeeding layer, and means for moving said mandrel in a longitudinal direction, during the application of the spiral layers.

In testimony whereof, we hereunto set our hands this 21st day of April 1909.

EUGENE D. C. BAYNE.
LAWRENCE A. SUBERS.

In presence of—
R. F. La Ganke,
W. T. Osborn.